Nov. 3, 1959  A. S. LAMBURN  2,911,010
VALVES FOR THE CONTROL OF FLUID FLOW
Filed Jan. 3, 1955
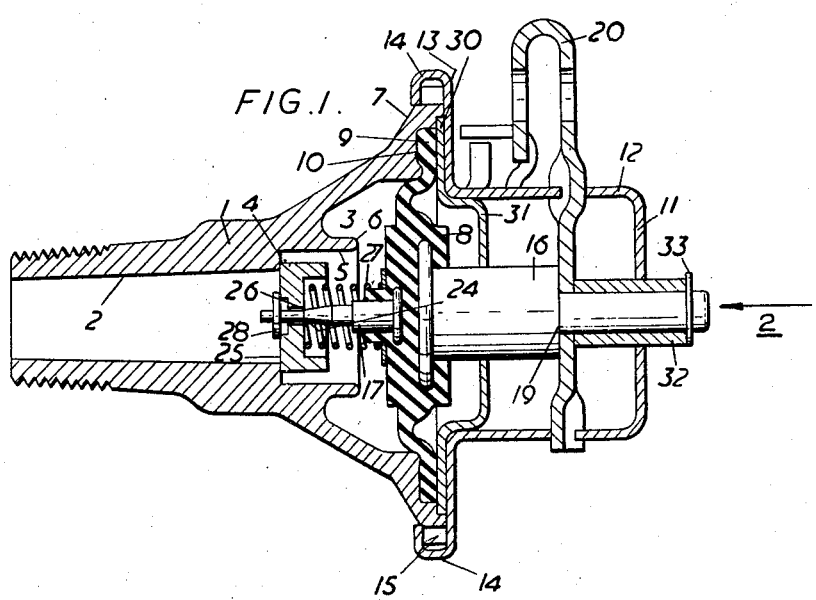
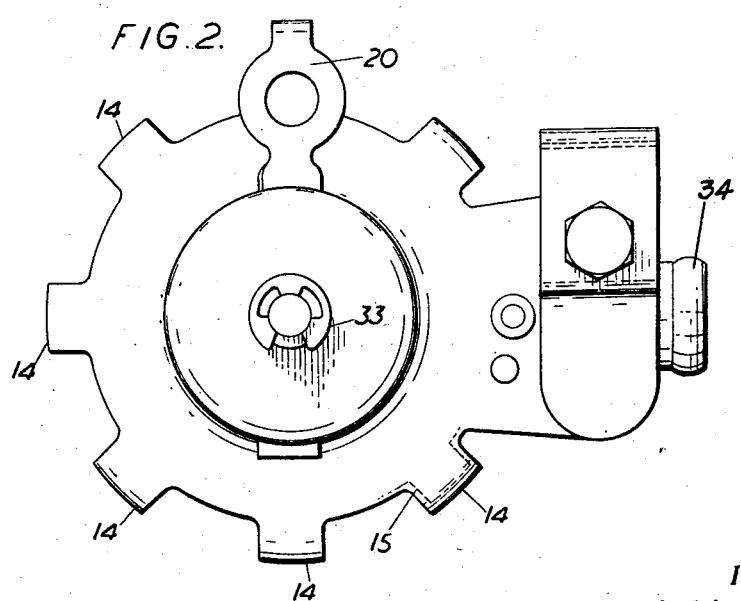
Inventor
A. S. LAMBURN
By Moore & Hall
Attorneys

United States Patent Office 2,911,010
Patented Nov. 3, 1959

2,911,010

VALVES FOR THE CONTROL OF FLUID FLOW

Alan S. Lamburn, Kenncott, near Lechlade, Gloucestershire, England, assignor to Smiths America Corporation, Ruxton, Md.

Application January 3, 1955, Serial No. 479,598

Claims priority, application Great Britain January 7, 1954

4 Claims. (Cl. 137—628)

The present invention relates to valve assemblages for the control of fluid flow, and has for its object the provision of a valve of relatively simple construction of this kind.

According to the present invention a valve assemblage comprises a diaphragm valve and needle valve having the passages therethrough in series, the needle valve being operated by movement of the diaphragm valve whereby in the "closed" position fluid flow is prevented by the diaphragm valve and upon movement of the diaphragm valve appreciably away from the closed position fluid flow is mainly controlled by the needle valve, thus allowing a fine control of fluid flow to be effected.

According to a further feature of the invention means are provided to by-pass the needle valve as the fully open position is approached.

A valve assemblage embodying the invention will now be described with reference to the accompanying drawings, of which:

Figure 1 shows a section through the assemblage.

Figure 2 shows a view of the assemblage from the direction of arrow "2" in Figure 1.

The assemblage comprises a die-cast fluid-tight housing 1 provided with a circular cylindrical outlet duct 34 communicating with an annular chamber 3. Inlet duct 2 is formed adjacent its inner end with a portion of increased diameter 5, one end of this portion being bounded by an annular ledge 4 and the other by a circular lip 6. Fluid flow between the inlet and outlet ducts can only take place past lip 6. Housing 1 is provided with a flange 7 whose plane is parallel to that of lip 6. A flexible diaphragm 8 (of rubber or the like material) is provided at its periphery with a bead 9 fitting into an annular groove 10 formed towards the inner edge of flange 7. Bead 9 is retained in groove 10 by the flange 30 of a flanged cup shaped sheet-metal member 31, which in its turn is retained by a further flanged cup-shaped sheet-metal member 11. Diaphragm 8 may seat against lip 6, thus defining therewith a diaphragm valve. Member 11 has a cylindrical portion 12, whose interior engages with the exterior of member 31. The flange of member 11 is indicated at 13. Flange 13 is of substantially the same diameter as flange 7, and is provided with a number of bent-over tongues 14 which co-operate with appropriately-spaced tongues 15 on the periphery of flange 7 to retain member 11 (and 31) in position (see Figure 2). A liquid-tight seal is thus produced between bead 9 and groove 10. Diaphragm 8 is provided with two centrally-disposed mushroom-shaped metal inserts 16, 17, the stems protruding therefrom in opposite directions. The stem of insert 16 is stepped, as indicated at 19, and is located by means of holes formed in the bases of members 11 and 31. Step 19 engages with an operating lever 20, a hole in the lever surrounding the stem, and the lever being retained in position by a sleeve 32 fitting over the smaller diameter portion of the stem, the sleeve 32 being retained in position by a clip 33. The exterior of sleeve 32 engages with the hole formed in the base of member 11. Lever 20 engages with two similar diametrally-opposed helical slots formed in the wall of portion 12, so that as lever 20 is rotated about the axis of portion 12 diaphragm 8 is moved axially. The slots are so disposed that in one extreme position of lever 20 diaphragm 8 is firmly seated against lip 6 and as it is moved towards its other extreme position diaphragm 8 is withdrawn from lip 6.

The stem of insert 17 is provided with a tapered needle portion 24 which passes through a hole 26 formed in a part 25, thus defining a needle valve. Part 25 is in the general form of a shallow cup, whose external diameter is intermediate between the initial portion of duct 2 and portion 5. Part 25 is normally seated against ledge 4 by a helical spring 27, one end of which engages with part 25 and whose other end engages with diaphragm 8. Clip 28, carried near the end of the stem of insert 17, is capable of engaging with the base of part 25.

The arrangement is such that when diaphragm 8 is seated against lip 6 and lever 20 is in the fully closed position, hole 26 is substantially closed by needle portion 24. As lever 20 is moved away from this position diaphragm 8 is withdrawn from lip 6 and the main control of fluid flow is provided by 24 and 26, the rate of flow being determined by the position of lever 20. When the position in which clip 28 engages with part 25 is reached however (this position being that shown in Figure 1), further movement of lever 20 towards the fully open position lifts part 25 from ledge 4 and thereafter the needle valve is by-passed.

This valve arrangement is particularly suitable for use in conjunction with heating systems of the kind in which air is passed through a heat-exchanger supplied with hot liquid, and the air temperature is controlled by varying the rate of flow of hot liquid through the exchanger. The fine control of liquid flow provided enables a fine control of temperature to be attained.

It will be appreciated that the valve should be used so that when in the closed condition diaphragm 8 is subjected to the smallest pressure-differential possible, so that undue strain is avoided.

I claim:

1. A valve assemblage comprising a diaphragm valve and a needle valve having the passages therethrough in series, said needle valve being operated by the diaphragm valve whereby in the closed position fluid flow is prevented by the diaphragm valve and upon movement of the diaphragm valve away from the closed position fluid flow is mainly controlled by the needle valve whereby a fine control of fluid flow is effected; said assemblage having means to by-pass said needle valve as the fully opened position thereof is approached, said diaphragm valve comprising a flexible diaphragm capable of movement to engage with a seat, and said needle valve comprising a first member attached to said diaphragm and having an elongate portion extending in the direction of movement of the diaphragm, said elongate portion being provided with a tapered region cooperating with a hole formed in a part of said assemblage to control fluid flow through said hole, movement of the diaphragm away from the seat resulting in lessened obstruction to fluid flow through said hole, said hole being substantially blocked by said first member when the diaphragm is in engagement with the seat, said part being displaceable away from a further seat to by-pass the needle valve, comprising spring means engaging with said part normally to hold it in contact with said further seat, and means on the elongated portion to engage with said part and displace it away from said further seat as the diaphragm valve approaches its fully open position.

2. An assemblage as claimed in claim 1 wherein the spring means comprise a helical spring surrounding the elongated portion and engaging with the part and the diaphragm.

3. The combination set forth in claim 2, said assemblage comprising a second member attached to said diaphragm and having an elongate portion extending in the direction of movement of the diaphragm in the opposite sense to that of said first member, support means for said second member limiting movement thereof to the direction of movement of the diaphragm.

4. The combination set forth in claim 3, an operating lever for engaging both with said second member and with one or more helical slots disposed about the said member whereby rotation of said operating lever about said elongate portion results in motion of the diaphragm in relation to its seat.

References Cited in the file of this patent

UNITED STATES PATENTS

| | | |
|---|---|---|
| 208,986 | Patterson | Oct. 15, 1878 |
| 2,370,182 | Morrow | Feb. 27, 1945 |
| 2,516,825 | Hejduk | July 25, 1950 |
| 2,648,518 | Curtis | Aug. 11, 1953 |

FOREIGN PATENTS

| | | |
|---|---|---|
| 697,100 | Great Britain | Sept. 16, 1953 |